United States Patent
Suzuki et al.

(10) Patent No.: US 7,147,354 B2
(45) Date of Patent: Dec. 12, 2006

(54) INTERIOR ILLUMINATION LAMP

(75) Inventors: Hiroyuki Suzuki, Haibara-gun (JP);
Kimihiro Ishii, Haibara-gun (JP);
Motoya Kimura, Toyota (JP); Koji Minakawa, Toyota (JP); Hiroshi Andou, Kariya (JP)

(73) Assignee: Yazaki Corporation, Tokyo (JP)

( * ) Notice: Subject to any disclaimer, the term of this patent is extended or adjusted under 35 U.S.C. 154(b) by 47 days.

(21) Appl. No.: 10/969,210

(22) Filed: Oct. 21, 2004

(65) Prior Publication Data
US 2005/0157512 A1    Jul. 21, 2005

(30) Foreign Application Priority Data
Oct. 22, 2003  (JP) .......................... P2003-361792

(51) Int. Cl.
*B60Q 1/00* (2006.01)
(52) U.S. Cl. ...................................... 362/488; 362/490
(58) Field of Classification Search ................. 362/488
See application file for complete search history.

(56) References Cited

U.S. PATENT DOCUMENTS

| 4,142,227 | A | * | 2/1979 | Aikens | ........................ 362/528 |
| 6,595,656 | B1 | * | 7/2003 | Yoda | ........................... 362/544 |
| 6,755,554 | B1 | * | 6/2004 | Ohmae et al. | .............. 362/293 |

FOREIGN PATENT DOCUMENTS

JP    2000-1141 A    1/2000

\* cited by examiner

*Primary Examiner*—Ali Alavi
(74) *Attorney, Agent, or Firm*—Sughrue Mion, PLLC

(57) ABSTRACT

The invention is to provide an interior illumination lamp which can change lighting directions, not directly touching lenses by the fingers. If rotating fins in the forward direction of the lenses, outer bezels are rotated together, so that a light emitting direction can be adjusted, not directly contacting the lenses with the fingers as conventionally. Even if the lenses are heated, the light emitting directions can be adjusted thereby. Not directly contacting the lenses by the fingers, the lenses are prevented from being stained to decrease illumination. In addition, since the fins avoid the light diffusion, a driver and other riding people are kept off dazzling by the light.

2 Claims, 7 Drawing Sheets

US 7,147,354 B2

INTERIOR ILLUMINATION LAMP

BACKGROUND OF THE INVENTION

1. Field of the Invention

The present invention relates to an interior illumination lamp to be furnished to, for example, a door or a ceiling of an automobile.

2. Related Art

As an existing interior illumination lamp, such a device shown, for example, in FIG. 8 is disclosure as shown in Unexamined Japanese Patent Publication 2000-1141.

This interior illumination lamp is furnished to, e.g., a back-door of a wagon, and if changing a lighting direction, the interior illumination lamp lights a luggage room at the rear part of the wagon or the opened back-door.

As shown in FIG. 8, in this interior illumination lamp 100, a lamp housing 102 is furnished to a trim 101 forming a wall of a back-door, and in the forward direction of this lamp housing 102, a spherical opening 103 is provided. In the backward side from the opening 103 (the right side in FIG. 8), there is equipped a lamp supporter 104 having a spherical inside where a partially spherical lamp main body 105 is equipped as rotatably 360° within a determined range. Inside of the lamp main body 105, a bulb 106 is attached, and in the forward side (the left side in FIG. 8), there is equipped a lens part 107 projecting from the opening 103 of the lamp housing 102. Between the lens part 107 and the opening 103, a space S is provided to regulate the rotating amount of the lamp 105.

By the way, in the above mentioned interior illumination lamp 100, the lamp 105 attached with the bulb 106 can rotate 360° within the determined range by the fingers. In case the lens part 107 is heated (for example, around 65° C.) for a long time and if directly touching, burn is affected on the fingers, and an attention should be paid especially to children. When the lens part 107 is not heated if directly touching the lens part 107 with the fingers, it is stained to inconveniently decrease illuminance.

SUMMARY OF THE INVENTION

In view of the above mentioned problems involved with the prior art, the invention has been realized, and it is an object of the invention to provide an interior illumination lamp which can change lighting directions, not directly touching the lenses by the fingers.

For accomplishing the object, the invention is the interior illumination lamp, comprising a functioning main body secured to a car body and bezel parts being rotatably supported to supporters furnished to the functioning main body and having lenses for transmitting lights from light sources, said bezel parts being rotated with respect to functioning the main body so as to adjust directions of optical axes, provided in that fins are equipped in the forward direction of the lenses, said fins being rotated together with the bezel parts.

In the thus composed interior illumination lamp, the bezel part can be rotated together with the lenses by rotating the fins furnished in front of the lenses, so that the lighting direction can be adjusted, not directly contacting the lenses as conventionally. Even if the lenses are heated, the lighting directions can be adjusted thereby with ease. Not directly contacting the lenses by the fingers, the lenses are prevented from being stained to decrease illumination.

In addition, the invention is provided in that a plurality of parallel plate members are furnished in parallel with a direction combining the light source and a lighting object, said parallel plate members composing the fins.

In the interior illumination lamp composed as mentioned above, the plate members of the fins are parallel with the direction combining the light source and the lighting object, so that it is possible to prevent the light from diffusion, and other riding people are kept off dazzling by the light.

According to the invention, the bezel part can be rotated together with the lenses by rotating the fins furnished in front of the lenses, so that the emitting direction can be adjusted not contacting the lenses as conventionally. Even if the lenses are heated, the lighting directions can be adjusted thereby with ease. Not directly contacting the lenses by the fingers, the lenses are prevented from being stained to decrease illumination.

DETAILED DESCRIPTION OF THE PREFERRED EMBODIMENTS

In the following description, an embodiment of the invention will be made in detail with reference to the attached drawings.

Figure 1:
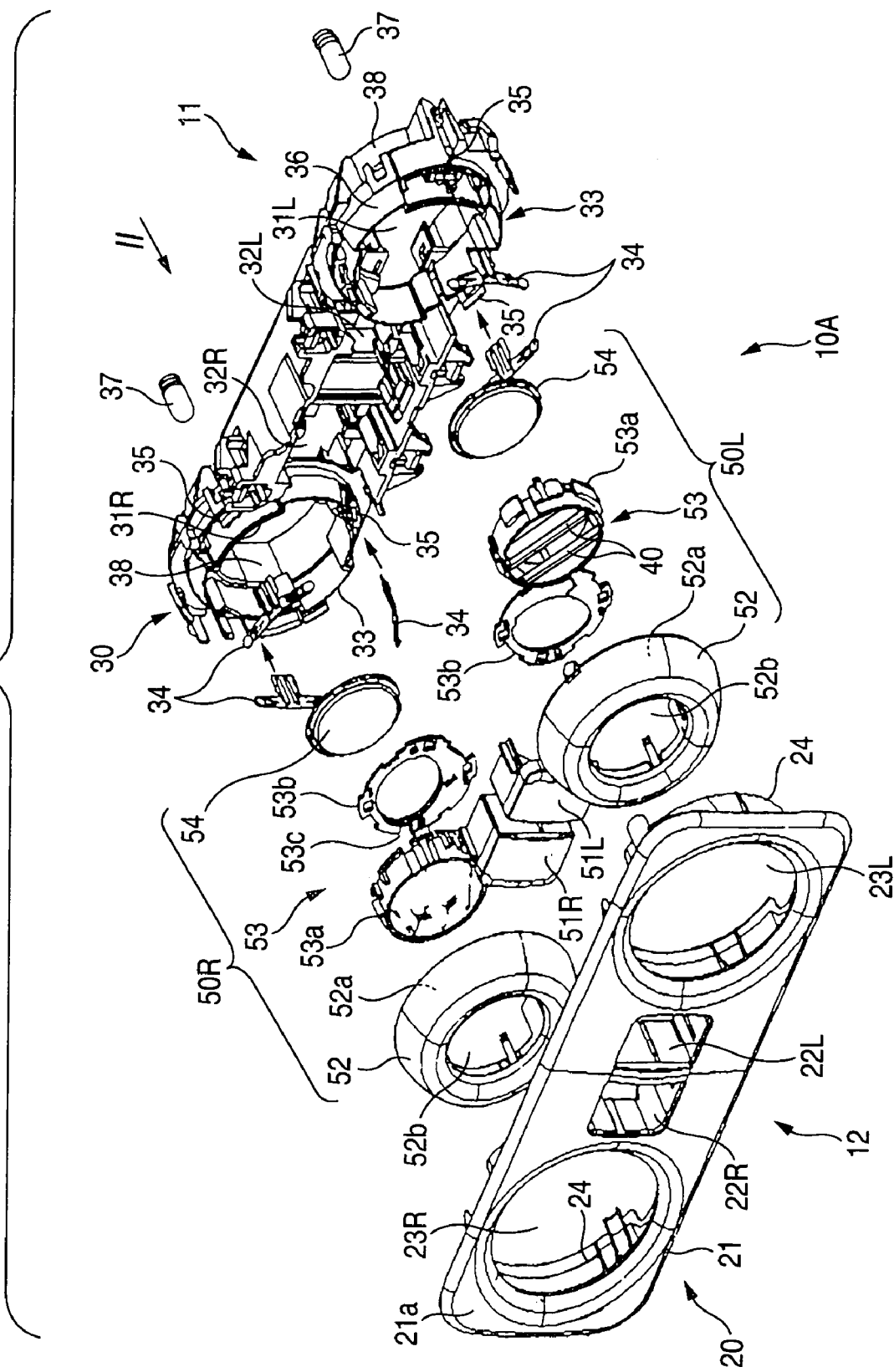
FIG. 1 is a disassembled perspective view showing the embodiment of the interior illumination lamp according to the invention.

As shown in FIG. 1, the interior illumination lamp 10 as the embodiment of the invention comprises a designed part 20 exposed in a car room 12 (see FIG. 4) and a functioning part main body 30 which is a placed inside of the designed part 20 and equipped with various kinds of electrical parts.

Figure 4:
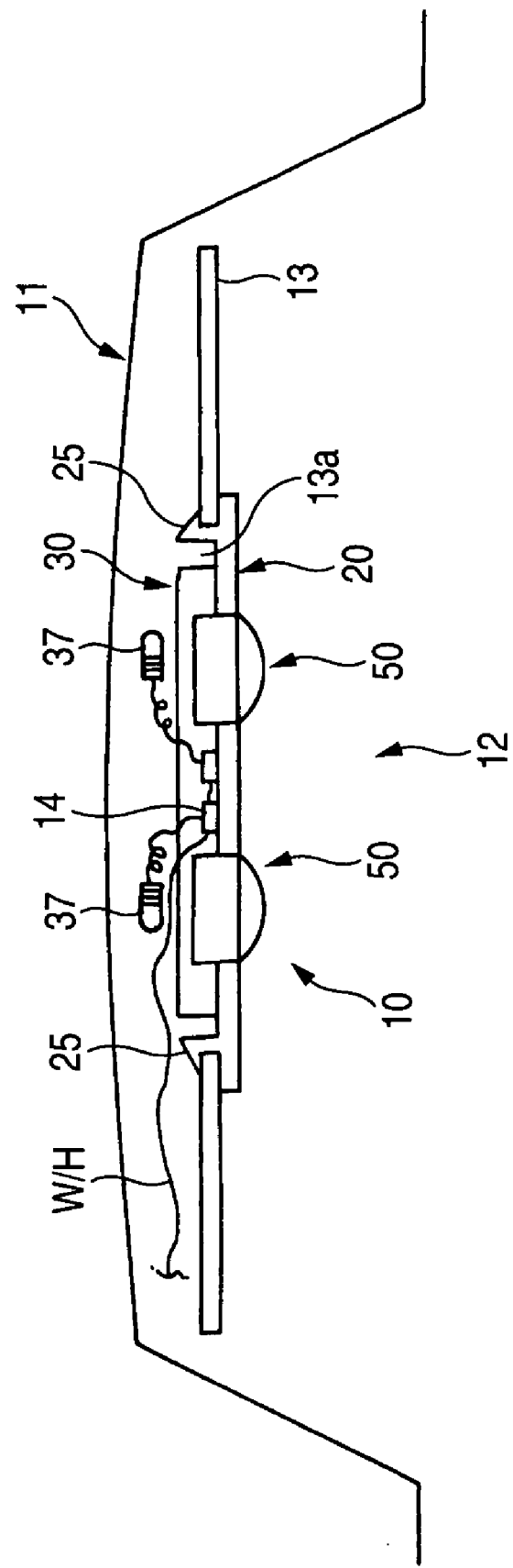
FIG. 4 is a cross sectional view showing the condition of attaching the interior illumination lamp of the invention to the car body.

As shown in FIG. 4, the interior illumination lamp 10 is provided by equipping the designed part 20 to an interior member (trim) 13 furnished to the inside of the car body 11, and is ready for connecting to a wire harness W/H previously wired to the backside of the interior member 13.

Figure 2:
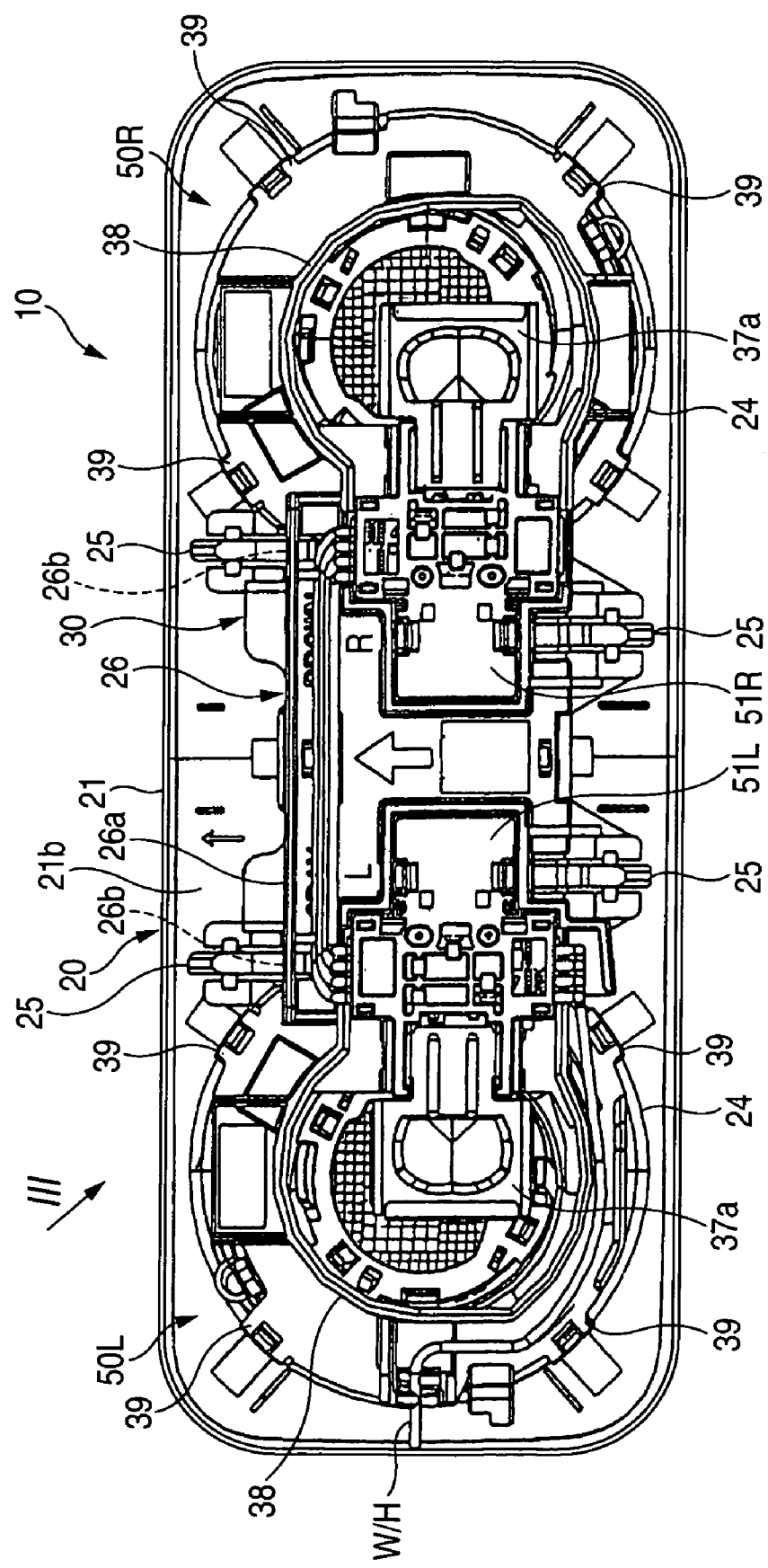
FIG. 2 is a rear view of the interior illumination lamp seen from the II direction in FIG. 1.
Figure 3:
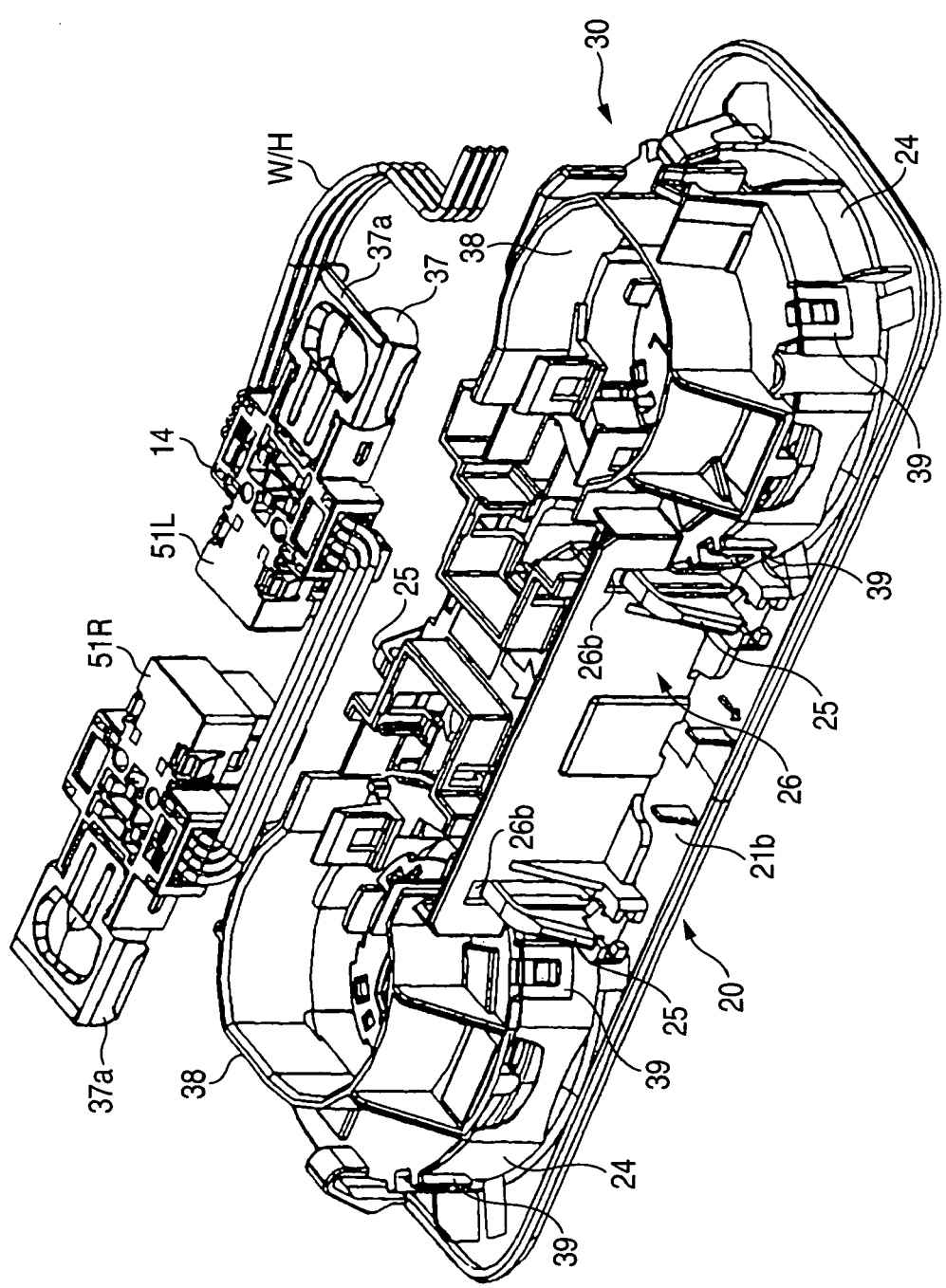
FIG. 3 is a perspective view seen from the III direction in FIG. 2.

As shown in FIGS. 1 to 3, the designed part 20 has a housing 21 in, e.g., rectangular shape, exposed at its surface 21a in the car room 12. The housing 21: is provided at the center with switch holes 22L, 22R for exposing left and right switches 51L, 51R in the car room 12, while the housing 21 is provided at the left and right parts with lamp holes 23L, 23R for exposing left and right lamps 50L, 50R in the car room 12. Each of the lamp holes 23L, 23R is furnished with an attaching part 24 in almost pillar shape facing from a rear side 21b to the inside of the housing 21 for equipping the functioning main body 30 to the housing 21. By the way, the housing 21 has clips 25 (see FIG. 4) on the rear side 21*b* for attaching the housing 21 to the ceiling of the car room 12.

As shown in FIGS. 1 to 3, the functioning main body 30 is a housing member of overall oblong shape, has holes 31L, 31R at left and right ends for receiving the lamps 50L, 50R, and has switch receiving parts 32L, 32R at the center for providing the switches 51L, 51R. The switches 51L, 51R are ready for detachably attaching by furnishing connectors 14 placed at the front ends of the wire harness W/H to the connecting terminals thereof (FIG. 4).

Both of lamp receiving holes 31L, 31R have circular ring members 33 on their circumferences as supporters for supporting the lamps 50L, 50R. The respective ring members 33 have guide members 38 of pillar shape projecting at the back side of the functioning main body 30 (the right side in FIG. 1). The left and right guide members 38 have cutouts in the opposite parts, enabling to attach the electrical parts such as the switches 51L, 51R, the bulb as the light source and others. The guide members 38 are highest than all of the attached electrical parts, and serve to prevent them from colliding with the cab body 11. The left and right guide members 38 are attached inside with the respective bulbs 37. At the rear sides of the bulbs 37 (upper part in FIG. 3), reflective plates 37*a* are provided for efficiently emitting the light issued from the bulbs 37 in desired directions.

As shown in FIG. 1, at positions, for example, trisecting the inner circumference of the ring member 33, concaves 35 are provided for holding sliding members 34. The sliding members 34 are attached by inserting into the sliding member holding concaves 35.

The sliding members 34 are metallic members shaped in T having elasticity, which are always pressed to spherical faces 52*a* by elasticity. The sliding member 34 may be made of resin, and have other shapes than T.

As shown in FIG. 1, at the outsides of the ring members 33 of the lamp receiving holes 31L, 31R, guide parts 36 are stepwise projected. The guide parts 36, when fitting to attach the sliding members 34 in the concaves 35, concentrically bury the spaces between the adjacent sliding members 34, and are provided to position inside than the concentric circle (spherical face 52*a*) combining the front ends of the sliding faces by the sliding members 34.

Further, on the outsides of the ring members 33, a plurality of holding pawls 39 are provided at appropriate intervals for attaching the functioning main body 30. Therefore, if holding the attaching parts 24 of the designed part 20 between the holding pawls 39 and the ring members 33, the functioning main body 30 and the housing 21 of the designed part 20 are connected.

As shown in FIG. 1, between the designed part 20 and the functioning main body 30, the left and right lamps 50L, 50R are equipped. Being the same, the left and right lamps 50L, 50R will be simply referred to with "lamp 50" in the following explanation excepting an especially necessary case.

The lamps 50 have outer bezels 52, inner bezels 53 and lenses 54, and radiate the light emitted from the bulbs 37 in the desired directions.

The outer bezels 52 as the bezel parts have sizes projecting at the front ends into the car room from the lamp holes 23L, 23R of the designed part 20, and the whole body is partially spherical, formed inside with concaved spheres 52*a*, and having windows 52*b* at the center for fitting the lenses 54.

The inner bezels 53 have pillar shaped bezel main bodies 53*a* and lens pressers 53*b* furnished in opening and closing manner to the bezel main bodies 53*a* via hinges 53*c*. Therefore, the lenses 54 are held by fitting the convexes of the lenses 54 to the rear parts of the bezel main bodies 53*a* and closing the lens pressers 53*b*.

By fitting the inner bezels 53 to the insides of the outer bezels 52, the inner bezels 53 are double engaged to the outer bezels 52.

The left and right laps 50L, 50R are furnished rotatably in the lamp receiving holes 31L, 31R of the functioning main body 30 and positioned fixedly in the determined places. That is, as shown in FIG. 1, the three sliding members 34 furnished in the functioning main body 30 are positioned inside of the outer bezels 52 and elastically urged to the spherical faces 54*a*. The outer bezels 52 are rotatable to the functioning main body 30, and secured in the determined position.

In the forward direction of the lenses 54, there are furnished fins 40 composed by arranging a plurality of narrow plates 41 in parallel. The fins 40 are furnished to, for example, the outer bezels 52 so as to rotate together with the outer bezels 52, and when rotating the outer bezels 52 by the fins 40, the light emitting direction may be controlled. The fin 40 may be formed as one body with the outer bezel 52, and is sufficient to be formed separately and attached to the outer bezel 52.

Figure 5:
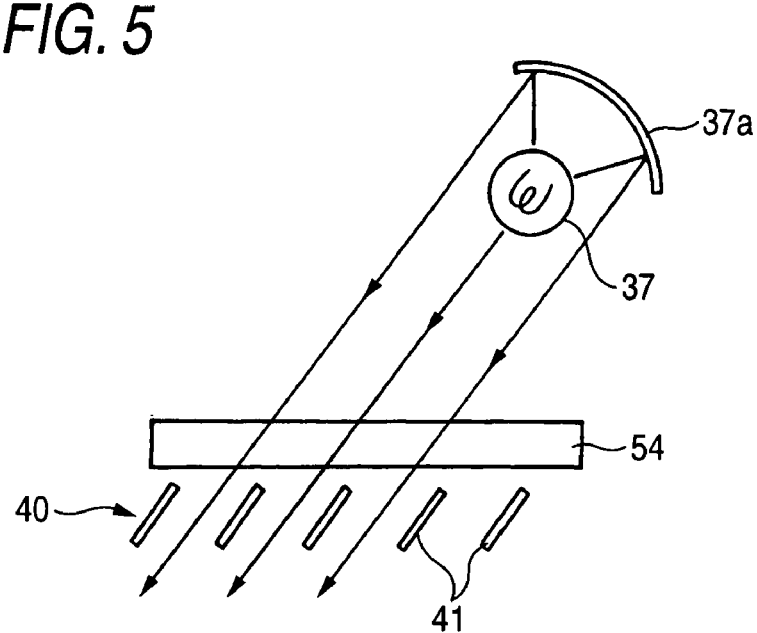
FIG. 5 is a cross sectional view showing one example of the relation of the bulb, the position of the lens, and an angle of the plate member of the fin.
Figure 6:
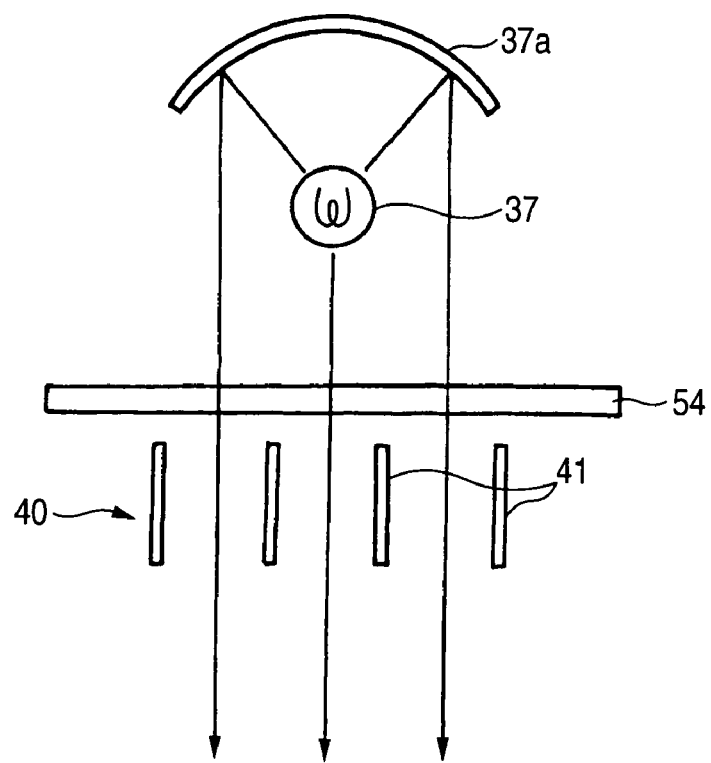
FIG. 6 is a cross sectional view showing another example of the relation of the bulb, the position of the lens, and an angle of the plate member of the fin.

The plates 41 of the fin 40 are angled such that the plates 41 are parallel with a direction combining the bulb 37 and the lighting object. Therefore, in case, as shown in FIG. 5, the bulb 37 and the reflecting plate 37*a* are offset, the plates 41 are inclined. In case, as shown in FIG. 6, the bulb 37 and the reflecting plate 37*a* are furnished with the axial line of the lens 54, and emit the lights in straight, the plates 41 are furnished parallel with the axial line of the lens 54. The respective plates 41 should not directly contact the lens 54, but keep the intervals narrow not to escape the light, for example, around 0.5 mm.

According to the interior illumination lamp 10, if rotating the fins 40 in the forward direction of the lenses 54, the outer bezels 52 are rotated together, so that the emitting direction can be adjusted not contacting the lenses 54 as conventionally. Even if the lenses 54 are heated, the light emitting directions can be adjusted thereby with ease. Not directly contacting the lenses 54 by the fingers, the lenses 54 are prevented from being stained to decrease illumination.

Since the plates 41 of the fins 40 are parallel with the lighting direction, the light is prevented from others' illumination. In particular, the light is prevented from entering into a driver's eyes via a room mirror, and hindrance of driving is checked.

The interior illumination lamp 10 of the invention is not limited to the above mentioned embodiment, and appropriate modifications or improvements are available.

Figure 7:
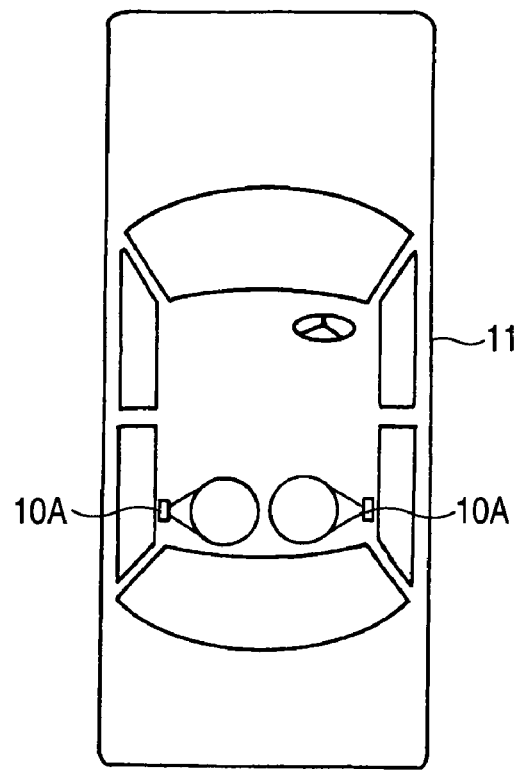
FIG. 7(A) is a view for explaining the case of providing the interior illumination lamps to both of left and right side walls of the room.
FIG. 7(B) is a view for explaining the effect thereof.
Figure 7:
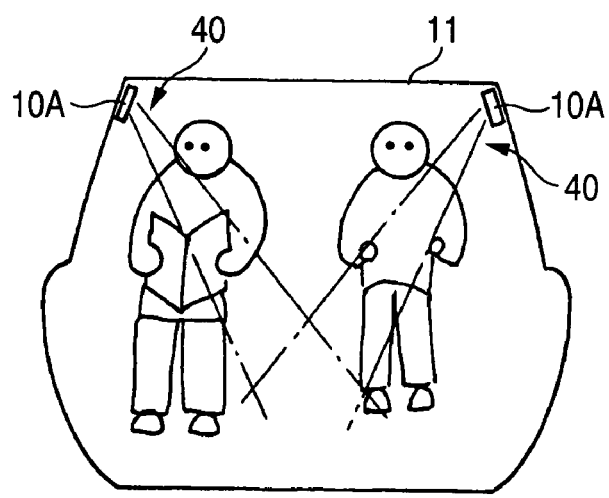
Figure 8:
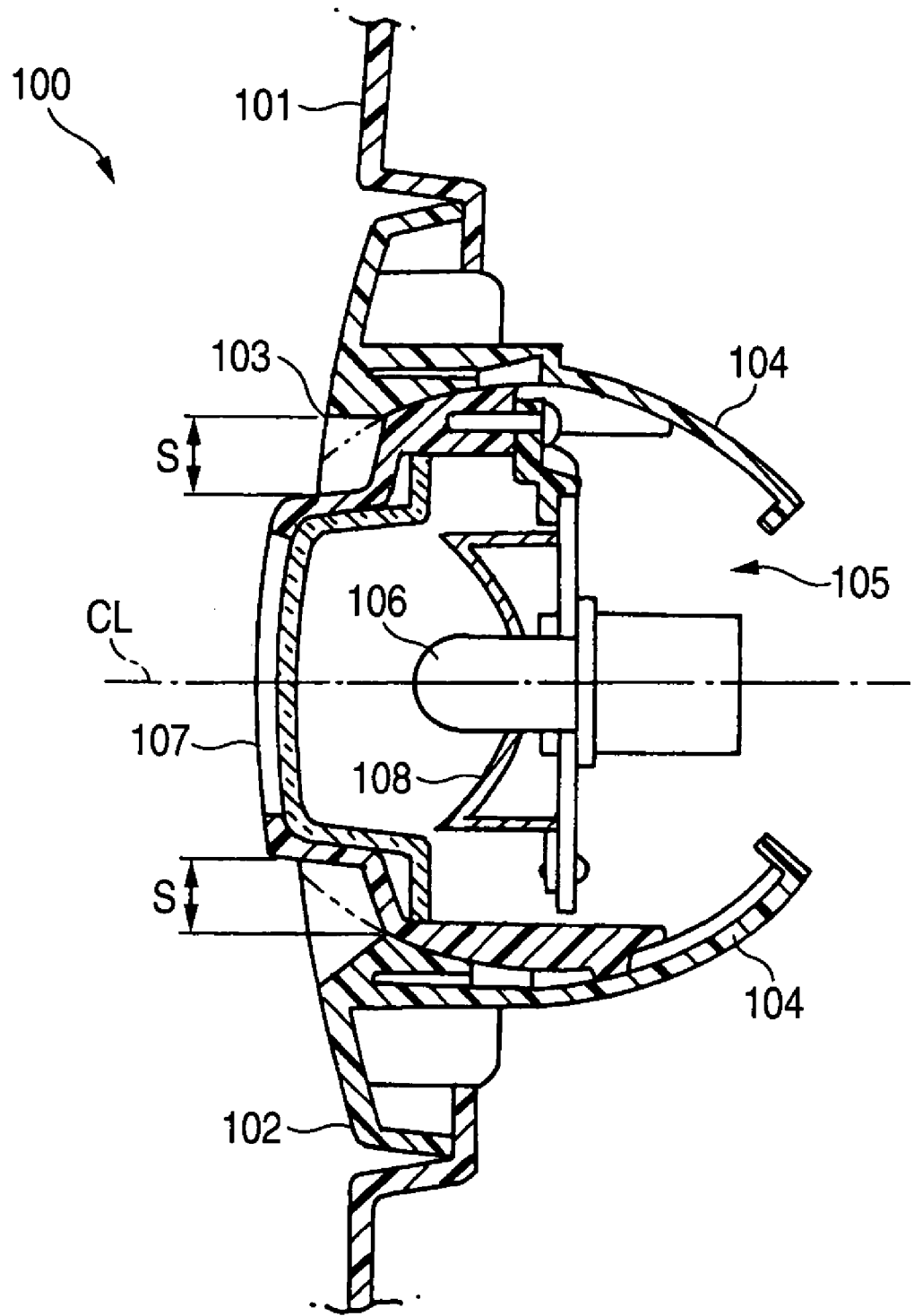
FIG. 8 is a cross sectional view showing one example of the conventional interior illumination lamp.

For example, the above mentioned embodiment has referred to the interior illumination lamp 10 of two-lighting type having a couple of left and right lamps 50L, 50R, but the number of the lamps is arbitrary, and the invention may be applied to a case as shown in FIG. 7A where the interior illumination lamp 10A of one-lighting type having one lamp 50 is equipped to each of left and right side walls, or further as shown in FIG. 7B, the directions of the plates 41 of the fins 40 are parallel with the lighting direction, so that an adjacent rising person is avoided from dazzling by the light irradiation.

In the above mentioned embodiment, the tilting angle of the plate 41 of the fin 40 is fixed in parallel with the radiating direction combining the bulb 37 and the lighting object, and the angle of the plate 41 can be made changeable.

As far as accomplishing the invention, others exemplified in the embodiment are arbitrary and not limited in such as the sliding members, outer and inner bezels, functioning main body, material qualities, shapes, dimensions, forms, numbers, or arranging places.

What is claimed is:

1. An interior illumination lamp comprising:
   a main body secured to a car body;
   a bezel portion rotatably supported to supporters provided to said main body and having lenses for transmitting lights from light sources, said bezel portion rotated with respect to said main body so as to adjust directions of optical axes; and
   fins equipped in the emergence side of the lenses, said fins rotated together with the bezel portion.

2. The interior illumination lamp as set forth in claim 1, wherein fin is defined by a plurality of parallel plate members which are arranged in parallel with a direction defined by the light source and a lighting object.

* * * * *